No. 857,563. PATENTED JUNE 18, 1907.
F. B. LEOPOLD & C. A. BROWN.
APPARATUS FOR FEEDING LIME TO WATER.
APPLICATION FILED JULY 13, 1906.
2 SHEETS—SHEET 1.
FIG. 1
FIG. 2
FIG. 3
FIG. 4
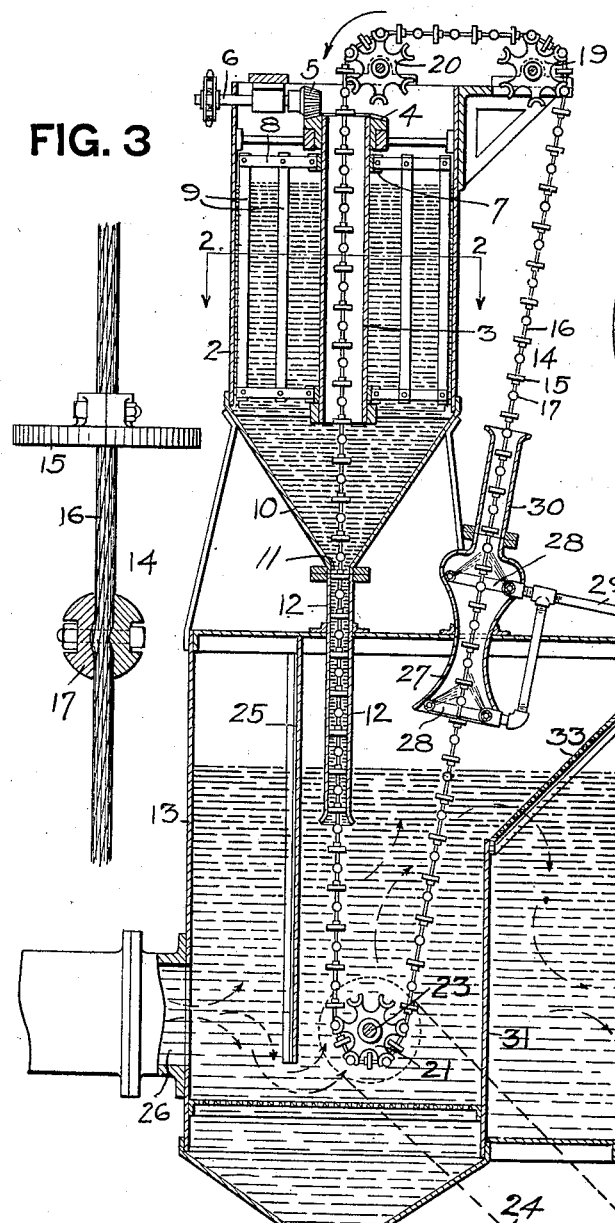
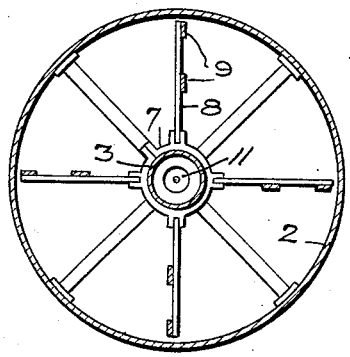
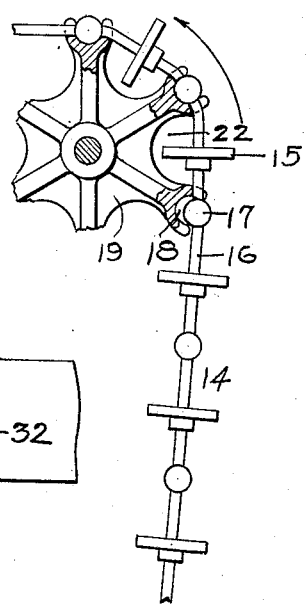
WITNESSES.
J. R. Heller
Robert C. Totten
INVENTORS
Frederick B. Leopold
and Charles A. Brown
By Kay Totten & Winter
attorneys No. 857,563. PATENTED JUNE 18, 1907.
F. B. LEOPOLD & C. A. BROWN.
APPARATUS FOR FEEDING LIME TO WATER.
APPLICATION FILED JULY 13, 1906.
2 SHEETS—SHEET 2.
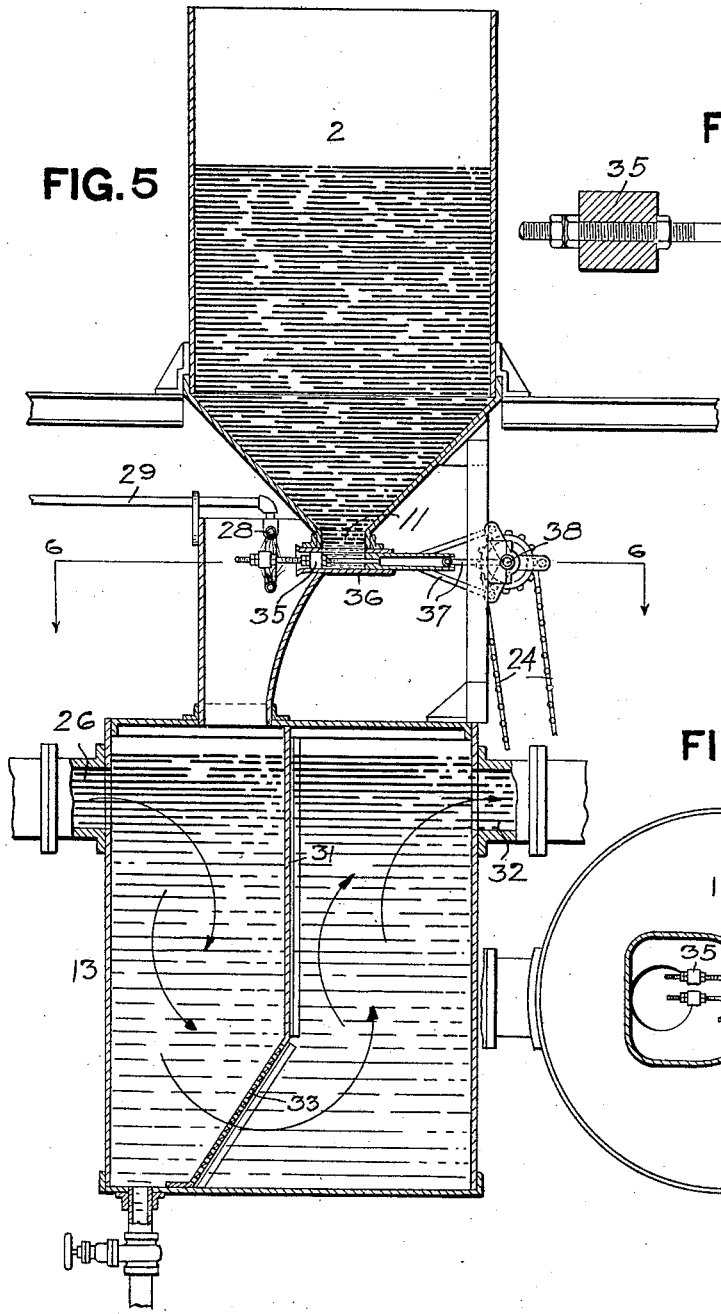
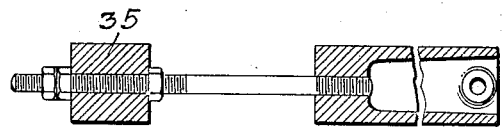
WITNESSES.
INVENTORS

UNITED STATES PATENT OFFICE.

FREDERICK B. LEOPOLD, OF EVANSTON, ILLINOIS, AND CHARLES ARTHUR BROWN, OF LORAIN, OHIO; SAID LEOPOLD ASSIGNOR TO PITTSBURGH FILTER MANUFACTURING COMPANY, OF PITTSBURG, PENNSYLVANIA, A CORPORATION OF PENNSYLVANIA.

APPARATUS FOR FEEDING LIME TO WATER.

No. 857,563.     Specification of Letters Patent.     Patented June 18, 1907.

Application filed July 13, 1906. Serial No. 325,936.

*To all whom it may concern:*

Be it known that we, FREDERICK B. LEOPOLD, a resident of Evanston, in the county of Cook and State of Illinois, and CHARLES ARTHUR BROWN, a resident of Lorain, in the county of Lorain, State of Ohio, have invented a new and useful Improvement in Apparatus for Feeding Lime to Water; and we do hereby declare the following to be a full, clear, and exact description thereof.

Our invention relates to apparatus for feeding lime to water in the process of purifying or softening water.

The object of our invention is to provide apparatus for the introduction of the lime in proper proportion to the amount of water to be treated, and readily adjustable so that the quantity of lime may be varied to suit different conditions.

To these ends our invention comprises, generally stated, a suitable receptacle for the lime in the form of a paste, a tank or reservoirs for the water, and means for introducing measured quantities of said lime to said water in a positive and accurate manner.

To enable others skilled in the art to make and use our invention we will explain the same more fully, referring to the accompanying drawings in which Figure 1 is a sectional elevation of our improved apparatus; Fig. 2 is a cross-section on line 2—2 Fig. 1; Fig. 3 is a detail of the conveyer; Fig. 4 is a detail of sprocket and conveyer; and Fig. 5 is a modified form; Fig. 6 is a horizontal section on line 6—6, Fig. 5; Fig. 7 is a detail of one of the pistons.

Like numerals indicate like parts in each of the figures.

The numeral 2 designates a suitable bin, or receptacle, adapted to contain lime paste of a certain known strength or consistency. Supported within said bin 2 is the hollow shaft 3 with the beveled cog 4 at the upper end thereof with which the bevel pinion 5 on the shaft 6 meshes. A stirrer 7 is secured to the shaft 3, said stirrer comprising the radiating arms 8 connected by the vertical strips 9.

At the lower end of the bin 2 is the hopper 10 with the circular outlet 11. A cylinder or conduit 12 projects downwardly from the outlet 11 into the tank 13 containing the water to be treated. The lower end of the cylinder 12 is outwardly flaring. A conveyer 14 carries pistons or flights 15 secured at suitable intervals to the cable 16. The cable 16 has the balls 17 secured thereto at intervals, said balls being adapted to engage correspondingly shaped recesses 18 in the sprocket wheels 19, 20 and 21. Said sprocket wheels are further provided with the recesses 22 which receive the pistons 15. The conveyer 14 engages the sprocket wheels 19, 20 and 21 as shown, the sprocket wheel 21 acting to drive said conveyer and being mounted on the drive shaft 23 connected up by the belt 24 to any suitable motor. The pistons 15 on the conveyer 14 pass down through the bin 2 and through the cylinder 12 into the tank 13 and so convey the lime-paste from said bin to said tank in measured quantities.

Within the tank 13 is the downwardly projecting baffle 25 which extends below the water level and opposite the inlet 26 so that the water entering said tank is deflected downwardly by said baffle. The purpose of this baffle 25 is to increase the velocity of the inflowing water and direct it with full force against the sprocket wheel 21 so as to flush said wheel and wash off any of the lime paste adhering thereto. This prevents the said wheel from becoming clogged so as to interfere with the engagement of the conveyer therewith. Furthermore, the pistons 15 are washed at the same time and the adhering paste removed therefrom. As a further precaution against the paste adhering to the pistons we provide the spraying apparatus which comprises the bell-shaped receptacle 27 within which are supported the circular spray pipes 28 connected up to the supply pipe 29. The water from these spray pipes 28 is directed toward the pistons passing through said receptacle and the paste washed therefrom passes back into the tank 13. A cylinder 30 may extend for a short distance from the upper end of the receptacle 27 to receive the pistons where the tank 13 is closed to operate under pressure.

A baffle 31 in the tank 13 separates the main portion of the tank from the outlet 32. From the upper end of the baffle 31 a perforated plate 33 extends to the walls of the tank and forms a strainer. At the bottom of the tank 13 is a valve controlled outlet for removing the deposit in the form of carbonates.

When our improved apparatus is in use the lime-paste of a known strength is introduced into the bin 2 and the water to be treated is admitted to the tank 13 in determined quantities. Power is then applied to operate the conveyer 14. As the conveyer passes through the lime-paste in the bin 2 the pistons carry with them into the cylinder 12 a fixed and definite amount of lime or just so much as may be contained between two contiguous pistons. The distance apart of the pistons controls the amount and when once it has been determined the proper proportion of lime to be admitted to correspond to the quality of the water and the quantity to be treated the pistons are located accordingly. If the quantity of lime is to be changed or introduced in different proportions the pistons may be readily adjusted accordingly. In this manner the proportion of lime to be introduced may be determined with great accuracy and when once fixed the apparatus works without further supervision. The movement of the pistons is positive and sure so that there is practically no liability of deviation.

The manner of introducing the water to the tank 13 together with the spray pipes 28 wash the pistons and remove the adhering paste and insure substantially all the lime finding its way into the water.

In Fig. 5 we have illustrated a modified form of our invention in which the pistons 35 operate horizontally in the cylinders 36. The pistons are connected up to piston rods 37 which are secured to the double crank shaft 38. The pistons operate alternately so that the lime is always being introduced to the water in the tank. The pistons 35 may have a shorter or longer movement by changing the stroke of the piston rods. In the same manner as above a fixed quantity of the lime-paste is added to the water on each stroke of the piston.

What we claim is:

1. In apparatus of the character described, the combination of a suitable lime-paste receptacle, a water tank communicating therewith, means for subdividing the lime paste, and means for feeding such subdivisions successively to said water tank.

2. In apparatus of the character described, the combination of a lime-paste receptacle, a water reservoir communicating therewith, and a series of pistons operating in succession to feed the lime-paste to said reservoir.

3. In apparatus of the character described, the combination of a lime-paste receptacle, a water reservoir communicating therewith, an endless conveyer carrying pistons, and means for moving said conveyer through said receptacle and into said reservoir.

4. In apparatus of the character described, the combination of a lime-paste receptacle, a water reservoir, a cylinder and a series of pistons adapted to enter said cylinder and feed the paste to said reservoir.

5. In apparatus of the character described, the combination of a lime-paste receptacle, a water reservoir communicating therewith, a cylinder, and endless conveyer carrying pistons adapted to pass through said cylinder and feed the paste to said reservoir.

6. In apparatus of the character described, the combination of a lime-paste receptacle, a water reservoir communicating therewith, an endless conveyer carrying a series of pistons adapted to feed the paste to said reservoir, and means for spraying said pistons.

7. In apparatus of the character described, the combination of a lime-paste receptacle, a water reservoir communicating therewith, an endless conveyer carrying a series of pistons adapted to feed the paste to said reservoir, a receptacle through which said pistons pass, and means for spraying said pistons therein.

8. In apparatus of the character described, the combination of a lime-paste receptacle, a water reservoir communicating therewith, an endless conveyer carrying a series of pistons adapted to feed the paste to said reservoir, a baffle in said reservoir extending below the inlet thereto, and said conveyer extending down adjacent to the lower end of said baffle.

9. In apparatus of the character described, the combination of a lime-paste receptacle, a water reservoir communicating therewith, an endless conveyer carrying a series of pistons adapted to feed the paste to said reservoir, a receptacle through which said pistons pass, said receptacle having an enlarged portion, a spray pipe in said enlarged portion, and a contracted portion leading from said receptacle.

10. In apparatus of the character described, the combination of a lime paste receptacle, a water reservoir communicating therewith, a contracted extension or tube extending from said lime paste receptacle down into the water in said tank, an endless conveyer carrying pistons, and means for moving said conveyer through said lime paste receptacle and said tube.

In testimony whereof, we, the said FREDERICK B. LEOPOLD and CHARLES A. BROWN, have hereunto set our hands.

FREDERICK B. LEOPOLD.
CHARLES ARTHUR BROWN.

Witnesses as to Leopold:
  S. H. JONES,
  ROBERT C. TOTTEN.
Witnesses as to Brown:
  WM. L. HUGHES,
  LOTTIE CLAWSON.